United States Patent Office
3,078,869
Patented Feb. 26, 1963

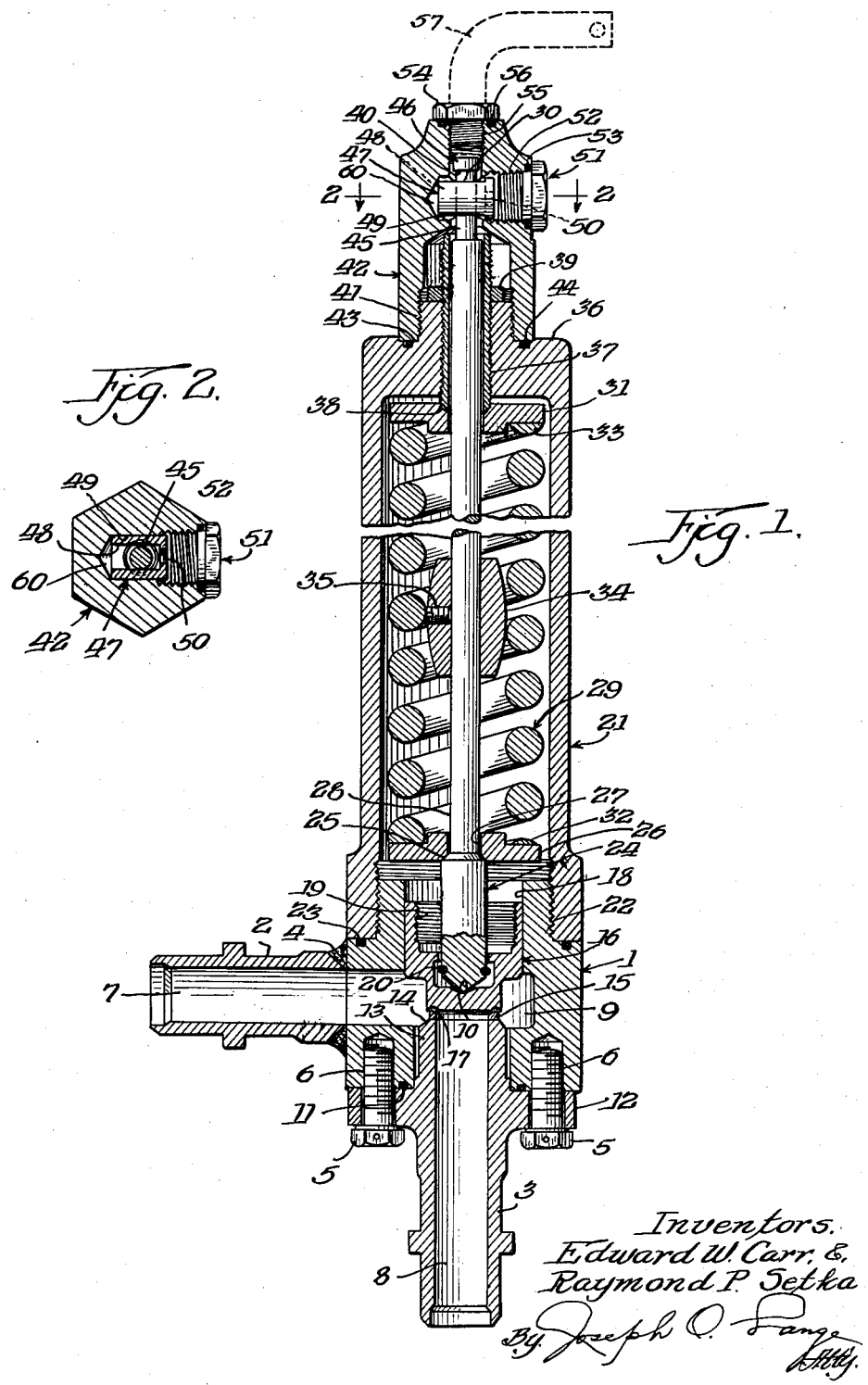

3,078,869
CLOSURE LIFTING MEANS FOR RELIEF
VALVES OR THE LIKE
Edward W. Carr, Cicero, and Raymond P. Setka, Chicago, Ill., assignors to Crane Co., Chicago, Ill., a corporation of Illinois
Filed Mar. 18, 1960, Ser. No. 15,971
3 Claims. (Cl. 137—523)

This invention relates generally to relief valves, and, more particularly, it is concerned with a valve disc-lifting or closure-lifting means for use in said relief valves.

At the outset, in order to acquire a better understanding of the significance and importance of this contribution to the art, it should be understood that heretofore in valves of this general type the matter of providing for the unseating of the valve manually has presented a number of difficulties. For example, frequently in the past, due to the excessive noises resulting from high flow rates encountered in fluid discharged, the application of suitable leverage was impractical. Also, in many instances, the valves were closed too soon, thus failing to provide adequate discharge of foreign matter. It will be understood in the latter connection that when such matter is trapped on valve seating surfaces, valve tightness is virtually destroyed.

Also, heretofore, it should be appreciated that the means for preserving fluid tightness around the valve body and bonnet of the relief valve compelled the use of packing around the valve stem, or else, elaborate seal lifting means were necessarily employed in which the deleterious effects of the unpredictable packing load created delayed or belated disc or closure lift, thereby to impart insecure seating and thus induce valve leakage.

In the construction constituting this invention, fluid pressure tightness between the valve parts is accomplished by means of a suitable metal-to-metal contact between the valve cap and the bonnet. Furthermore, as hereinafter disclosed, supplemental tightness can easily be obtained by the employment of an O-ring or similar simple sealing means.

It should also be noted in connection with discharging a valve manually, that it is desirable that the valve closure member be positively lifted whereby to supply any predetermined rise or lift in the closure member up to full opening and any corresponding flow orifice or flow rate intermediate thereto. The construction of the valve of this invention permits of such accomplishment very conveniently and by means of a novel arrangement of elements forming a sturdy, durable construction. Heretofore, it should be understood, in lever operated valves conforming to the requirement that they be manually maintainable in the open position, a considerable amount of effort has been necessary to accomplish such result and therefore created objectionable strain in the operation thereof by the operating personnel.

It is therefore another object of this invention to provide for a manual type of valve operation in which unloading pressure loads in a protracted emergency, such as in the case of fire, the valve unseating mechanism of this invention can be actuated and allowed to remain open whereby to discharge fluid contents through the valve, while the operator either attends to other duties immediately required, or he may safely leave dangerous premises with the full assurance that the valve is discharging continuously.

A further object is to provide for a valve actuator construction in which the lifting device of this invention is capable of being economically produced from rod materials and having the mechanical advantages of unseating the disc or closure member against high spring loads due to relying on a screw-and-jack principle. Further, it does not require that line fluid pressure aid the closure member in its unseating, which is a present requirement in most pressure vessel codes throughout the country. Thus, the need for an elaborate compounded leverage mechanism is eliminated.

A further object of the invention is to provide for a construction in which reliance on levers for their operation or actuation is avoided. The levers in the past have generally protruded far beyond the valve requiring safety measures, more space, and are limited in the direction of the application of force during the unseating operation.

Other objects and advantages will become more readily apparent upon proceeding with the description set forth in the following specification, in which:

FIG. 1 is a sectional assembly view of a relief valve embodying our invention; and FIG. 2 is a sectional view taken on the line 2—2 of FIG. 1.

Referring now to FIG. 1, the valve consists essentially of a valve body generally designated 1 and is preferably of hollow cylindrical configuration. At its lower side portion, the valve body or casing is provided with the body outlet stub 2 and at its lower portion on the central axis it is provided with the body inlet stub 3, which respectively are attached as at 4 by means of an annular weld to the valve body 1. At the lower portion thereof, the said inlet stub is held in place by means of a plurality of cap screws 5 threadedly engaging the lower tapped openings as at 6. As shown, each of the respective stubs 2 and 3 is provided with an axial port 7 and 8 arranged in intersecting relation to each other and communicating at the point of intersection with the body chamber 9. The gasket or O-ring 11 may be used additionally to effect a sealing connection between the body 1 and the bolted flange 12 attaching the inlet stub 3. At the innermost limit, the hub 13 is provided with a preferably raised seat 14 having the hardened annular seat face 15 and upon which the reciprocally movable closure member generally designated 16 normally rests as shown, the closure member being provided with an annular seat facing 17 for engagement with the first-named seat facing in the latter described position. Preferably, the closure member for purpose of its guiding within the said body is relatively closely fitted for effecting smooth sliding movement within the bore 18 thereof. The closure member is threaded on its interior portion as at 19 for the purpose of chucking it during the course of providing the seat facing and other related machining operations.

An elongated valve bonnet, generally designated 21, is threadedly attached to the valve casing as at 22 and preferably is mounted in shouldered relation thereto as indicated and preferably is sealed by means of the recessed O-ring 23. The bonnet 21 serves as a combined guide and housing for the valve stem generally designated 24. The latter member is provided with an annular shoulder as at 25 upon which the lower spring washer 26 is received for mounting thereon, the latter washer being apertured as at 27 to enclose a reduced portion 28 of the stem 24 immediately above said shoulder.

Supported upon the lower spring washer, the coil spring generally designated 29 is positioned, the upper limits of which spring abut the upper spring washer 31 with the respective lower and upper ends thereof designated 32 and 33 respectively having ground ends for suitable cooperation with the respective spring washers 26 and 31. Preferably at a predetermined axial position along the length of the stem and within the limits defined by the overall length of the spring 29, an anti-buckle spool 34 is mounted and held in place on the stem by means of the threaded set-screw 35. The purpose of the spool is to stabilize the positioning of the spring in the course of valve operation and to support the coils of the spring against inward buckling thereby to regulate the accuracy of the fluid discharge from the valve. At the upper end portion 36 of the bonnet 21, the threadedly journalled tubular adjusting screw 37 is applied having its lower end portion as at 38 bearing against the spring washer 31 and thereby adjust the compression applied to the spring 29. When the desired adjustment has been completed, a locknut 39 is applied as indicated to hold the adjusting screw against accidental rotation.

The upper end 36 of the bonnet is provided with a threaded upwardly extending shank portion 41 upon which the cap 42 is threadedly received to abut against the bonnet surface as at 43 and is preferably sealed by means of the O-ring 44. The said cap serves the important function of guarding against tampering with respect to the adjusting screw and lock-nut 37 and 39 respectively, and it also serves in a significant capacity having a novel function as hereinafter described in greater detail.

In the past, it should be understood that when it has been necessary to effect a manual fluid discharge by the relief valve or to lock the stem and valve closure member 16 in position, this has been necessarily effected by means of actuating levers relatively easily subject to tampering and clearly lacking the durability of the cap construction about to be described.

In cooperation with the said cap construction, it is to be noted that the stem 24 at the upper limits of its reduced portion 28 journalled within the adjusting screw 37 and extending through the latter member is provided with a reduced collar portion 45. The upper limits of the latter collar portion are defined by an enlargement or head portion 46 extending through the stem lift saddle member generally designated 47, which is bifurcated as more clearly shown in FIG. 2. Thus, the latter member in effect is slotted transversely as indicated more clearly at 48, and is relatively snugly received in a sliding fit within the bore 49 of the cap member 42. The said cap member in its outer configuration is preferably of polygonal cross-section for enabling the convenient application of a wrench for gripping and rotating, when necessary, for reasons hereinafter referred to in detail.

Upon placing the stem in the axial position shown (valve closed) and placing the transversely slotted portion 48 of the stem lift saddle 47 around the narrow portion 45 of the stem 24, the lift saddle plug generally designated 51 is attached to the cap by means of the threads 52 and is preferably sealed by means of an O-ring 53 as illustrated.

At the upper end portion of the cap member 42, what is termed a gagging plug 54 is attached by means of the threads 55 and is mounted in similar sealing relation by means of the O-ring 56 to the uppermost portion of the cap 42. Thus, it will now be apparent that should it become necessary for any reason to remove the stem lift saddle 47, the latter member is provided with the tapped portion 50 in which after unscrewing and removing the plug 51 a similarly threaded cap screw can be applied to the threads 50 to permit the axial withdrawal of the said stem lift saddle from the chamber 60.

A threaded gagging handle shown in dotted lines as at 57 is interchangeable with the said plug 54. It is provided with identical running threads engaging predeterminately as at 55 the internal threads of the stem lift saddle plug 54 so that upon removal of the latter member and upon suitable rotation of the handle 57 the latter member is rotated on the running thread 55 until it descends axially inwardly and contacts the top transverse surface of the shouldered portion 46 of the stem to hold the latter member firmly positioned within the valve closure member 16 as at 10. It will be noted that in permitting such slight axial movement of the stem that the lower portion of the stem is provided with a split ring 20 by means of which the stem is relatively loosely connected to the closure member 16. Thus, the valve is gagged or held in closed position.

It will be appreciated that in the valve normal position as illustrated and with the gagging plug 54 in the position shown its inner end limit defining the end of the threads 55, the said inner limit is in spaced apart relation to the top surface of the head portion 46 thereby to permit limited axial movement upwardly of the said stem and closure member in response to line fluid pressure.

Let it now be assumed that it becomes desirable to open the valve quickly for an immediate and substantially large discharge, say, in an emergency, of a high pressure fluid load accumulated within the valve inlet 8. Under such circumstances, a wrench is applied to the said polygonal portion of the cap 42 rotating the latter member upon the threads 41 of the bonnet shank. It will now become apparent that since the transversely mounted stem lift saddle 47 is supported by the threadedly moving cap 42, it will likewise be moved upwardly with the said cap until its oppositely disposed surface portions 30 contact the undersurface 40 of the head 46, thus immediately causing the stem 24 to be moved upwardly axially and thereby withdrawing the closure member 16 from its seat 15 under the influence of fluid pressure beneath the said disc or closure member. Such rotation of the cap 42 on the threads 41 will continue until such time as the desired discharge of fluid contents has been effected. Thus, it will be clear that an invention has been developed having practical application in a novel disc lifting means for both relief and safety valves enjoying the advantages of economical production with unusual durability in its provision for safety and accuracy of operation.

While only a single embodiment has been shown and described, it will, of course, be appreciated that this is for purpose of illustration only and is not one of limitation. Accordingly, the scope of the invention should be measured by the appended claims interpreted in light of the art.

We claim:

1. An actuating mechanism for a relief valve or the like, the combination of a resiliently biased reciprocally movable valve closure member, a bonnet member therefor, a stem engaging said closure member at its lower end portion and having an upper portion thereof projecting through said bonnet member, a hollow threaded cap mounted for predetermined axial movement on the said bonnet member and enclosing said upper projecting portion of the said stem, a removable bifurcated stem lift saddle member snugly received within a transverse bored portion of the cap and predeterminately engaging said stem projecting portion, a plug transversely mounted in the cap bored portion to cooperate with said saddle member for retaining the said saddle member against substantial endwise movement around the upper portion of the said stem, the projecting portion of the stem including a neck receivable within the bifurcated portion of said saddle member, the said stem neck portion having an enlarged T-head portion defining an end limit of said upper projecting portion of the stem, the said saddle member and stem being movable with said hollow cap to lift the stem upon predetermined movement of said cap and engagement of the saddle member by the stem enlarged head portion, a gagging plug on the said cap with its inner end limit normally in spaced apart adjustable relation to the upper end of the said stem to permit limited axial movement of the said stem and closure member in response to line fluid pressure.

2. An actuating mechanism of the character described for a relief valve or the like, the combination of a resiliently biased reciprocally movable valve closure member, a bonnet member therefor, a stem engaging said closure member at its lower end portion and having an upper portion with a reduced portion and adjoining enlarged head section projecting through said bonnet member, a hollow cap threadedly mounted for axial movement relative to the said bonnet member and enclosing the upper projecting portion of the said stem, the said cap being axially adjustable relative to said bonnet member to permit predeterminately increased fluid discharge past the said closure member, a bifurcated stem lift saddle member transversely extending within a bored portion of the said cap, the said saddle member being predeterminately engageable upon predetermined rotation and axial movement of the said threaded cap in a direction axially away from the said bonnet member with said cap and said stem reduced portion adjoining enlarged head section of the said stem projecting portion whereby to guide the stem in the opening movement of said closure member, a transversely mounted plug in a bored portion of the cap for retaining the said saddle member within said cap portion against substantial endwise movement while the latter member is engaged by said stem enlarged head section, a gagging plug removably mounted on the said cap with its inner end limit normally in adjustable axially spaced apart relation to the enlarged head end of the said stem to permit limited axial movement of the said stem and closure member in response to line fluid pressure.

3. An actuating mechanism of the type described for predeterminately discharging a relief valve or the like, the combination of a resiliently biased reciprocally movable valve closure member, a bonnet member therefor, a stem engaging said closure member at its lower end portion and having an upper portion thereof reduced for a predetermined length defined by an enlarged head projecting through said bonnet member, a hollow cap threadedly mounted on the bonnet member for predetermined axial movement relative to the said bonnet member to open the valve, the said cap enclosing the said upper projecting portion of the said stem, a transversely extending removable stem lift saddle member mounted in a side wall of said cap having a divided inner open end portion predeterminately engageable with said upper reduced end of said stem projecting portion at the enlarged head, a plug substantially transversely mounted in a bored portion in the cap for retaining the said saddle member non-rotatably around the said upper reduced end portion of the said stem, the said stem and saddle member being movable wtih said threaded cap upon predetermined axial movement of said latter member relative to said bonnet member, a removably mounted rotatable gagging plug on the said cap in axially and aligned adjustable relation to the said stem with its inner end limit normally in spaced apart relation to the upper end of the said stem to permit limited axial movement of the said stem and closure member in response to line fluid pressure, the said gagging plug being selectively removable from an end portion of the said cap for insertion of means to abut the stem enlarged head and retain the valve closure member positively in closed position when said threaded cap is firmly mounted against an outer end annular surface portion of said bonnet member.

References Cited in the file of this patent
UNITED STATES PATENTS

| | | |
|---|---|---|
| 315,273 | Gilbert | Apr. 7, 1885 |
| 372,503 | Wheeler | Nov. 1, 1887 |
| 826,404 | Cody | July 17, 1906 |
| 905,745 | Orr | Dec. 1, 1908 |
| 1,161,873 | Mahoney | Nov. 30, 1915 |
| 2,204,856 | Hinrichs | June 18, 1940 |

FOREIGN PATENTS

| | | |
|---|---|---|
| 463,362 | Italy | Apr. 30, 1951 |